(12) United States Patent
De Jong et al.

(10) Patent No.: US 10,781,943 B2
(45) Date of Patent: Sep. 22, 2020

(54) ABANDONMENT AND RECOVERY SYSTEM FOR A SUBSEA PIPELINE

(71) Applicant: BLUEMARINE OFFSHORE YARD SERVICE B.V., Rotterdam (NL)

(72) Inventors: Pieter Hilbrand De Jong, Nootdorp (NL); Eline Wilhelmina Heerema, The Hague (NL)

(73) Assignee: BLUEMARINE OFFSHORE YARD SERVICE B.V., Rotterdam (NL)

( * ) Notice: Subject to any disclaimer, the term of this patent is extended or adjusted under 35 U.S.C. 154(b) by 0 days.

(21) Appl. No.: 16/495,473

(22) PCT Filed: Mar. 23, 2018

(86) PCT No.: PCT/NL2018/050182
§ 371 (c)(1),
(2) Date: Sep. 19, 2019

(87) PCT Pub. No.: WO2018/174717
PCT Pub. Date: Sep. 27, 2018

(65) Prior Publication Data
US 2020/0096134 A1 Mar. 26, 2020

(30) Foreign Application Priority Data
Mar. 23, 2017 (NL) .................................. 2018569

(51) Int. Cl.
*F16L 1/16* (2006.01)
*F16L 1/20* (2006.01)

(52) U.S. Cl.
CPC ................. *F16L 1/166* (2013.01); *F16L 1/20* (2013.01)

(58) Field of Classification Search
CPC combination set(s) only.
See application file for complete search history.

(56) References Cited

U.S. PATENT DOCUMENTS

| 4,153,381 A | 5/1979 | Hawley |
| 5,318,384 A | 6/1994 | Maloberti et al. |
| 6,030,145 A * | 2/2000 | Stewart, Jr. ........... E21B 17/015 405/171 |
| 6,729,802 B2 * | 5/2004 | Giovannini ............. F16L 1/166 405/158 |
| 2007/0081862 A1 * | 4/2007 | Wolbers ................ E21B 17/015 405/169 |

(Continued)

FOREIGN PATENT DOCUMENTS

| EP | 1850043 A2 | 10/2007 |
| GB | 2027157 A | 2/1980 |
| WO | 0148410 A1 | 7/2001 |

OTHER PUBLICATIONS

International Search Report and Written Opinion for the International Patent Application No. PCT/NL2018/050182, dated Jun. 14, 2018, 12 pages.

*Primary Examiner* — Kyle Armstrong

(57) ABSTRACT

An abandonment and recovery system for a subsea pipeline. The system according includes a pipeline attachment assembly configured to be attached to a pipeline end; and a cable attachment assembly configured to be attached to at least one abandonment and recovery cable. The bendable connection has, over the distance thereof, an essentially constant circumferential shape and an essentially constant size.

22 Claims, 8 Drawing Sheets

(56) References Cited

U.S. PATENT DOCUMENTS

| | | | | |
|---|---|---|---|---|
| 2007/0248418 | A1* | 10/2007 | Steenhuis | B63B 35/04 405/158 |
| 2011/0142543 | A1* | 6/2011 | Griffin | F16L 1/19 405/173 |
| 2013/0115007 | A1* | 5/2013 | Cruickshank | F16L 1/166 405/166 |

* cited by examiner

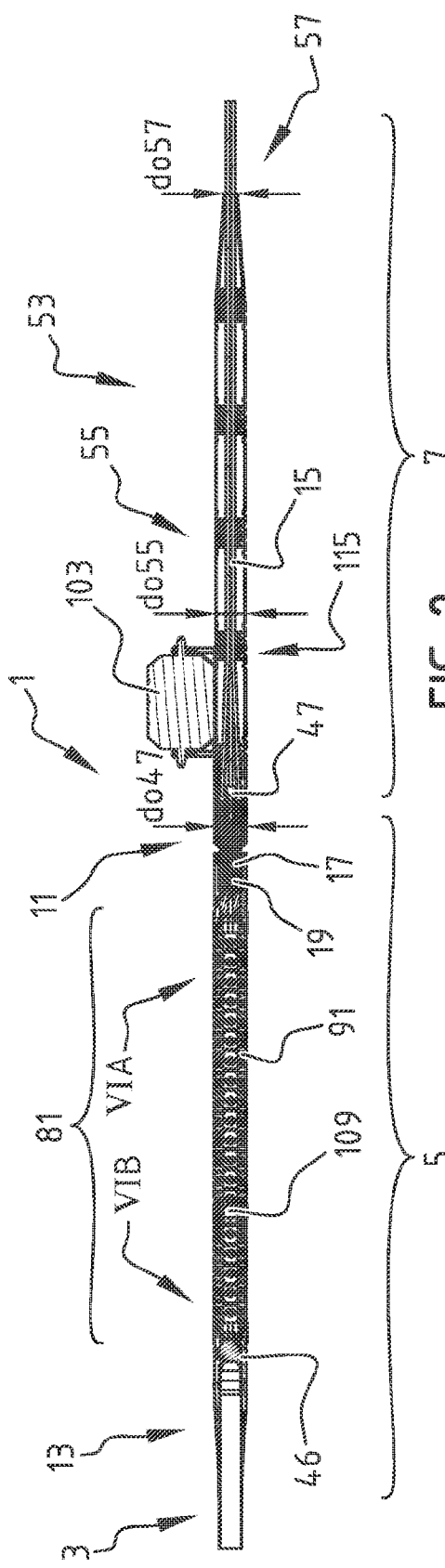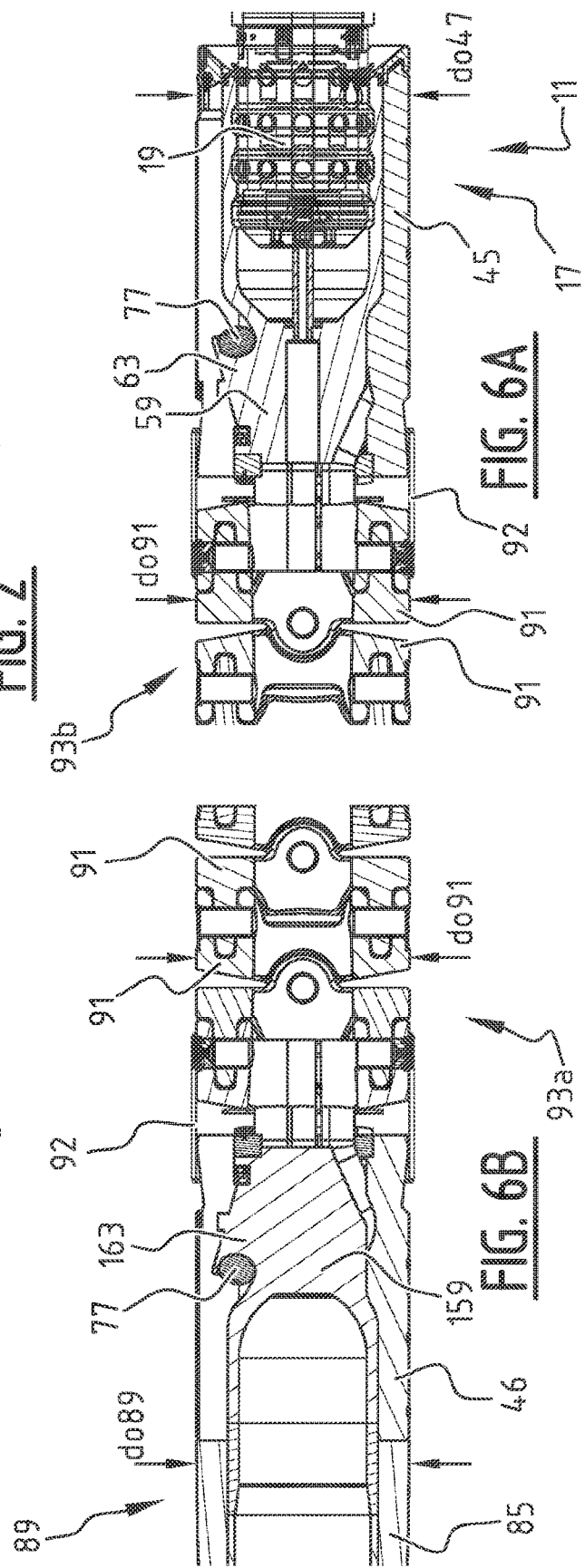
FIG. 2
FIG. 6A
FIG. 6B

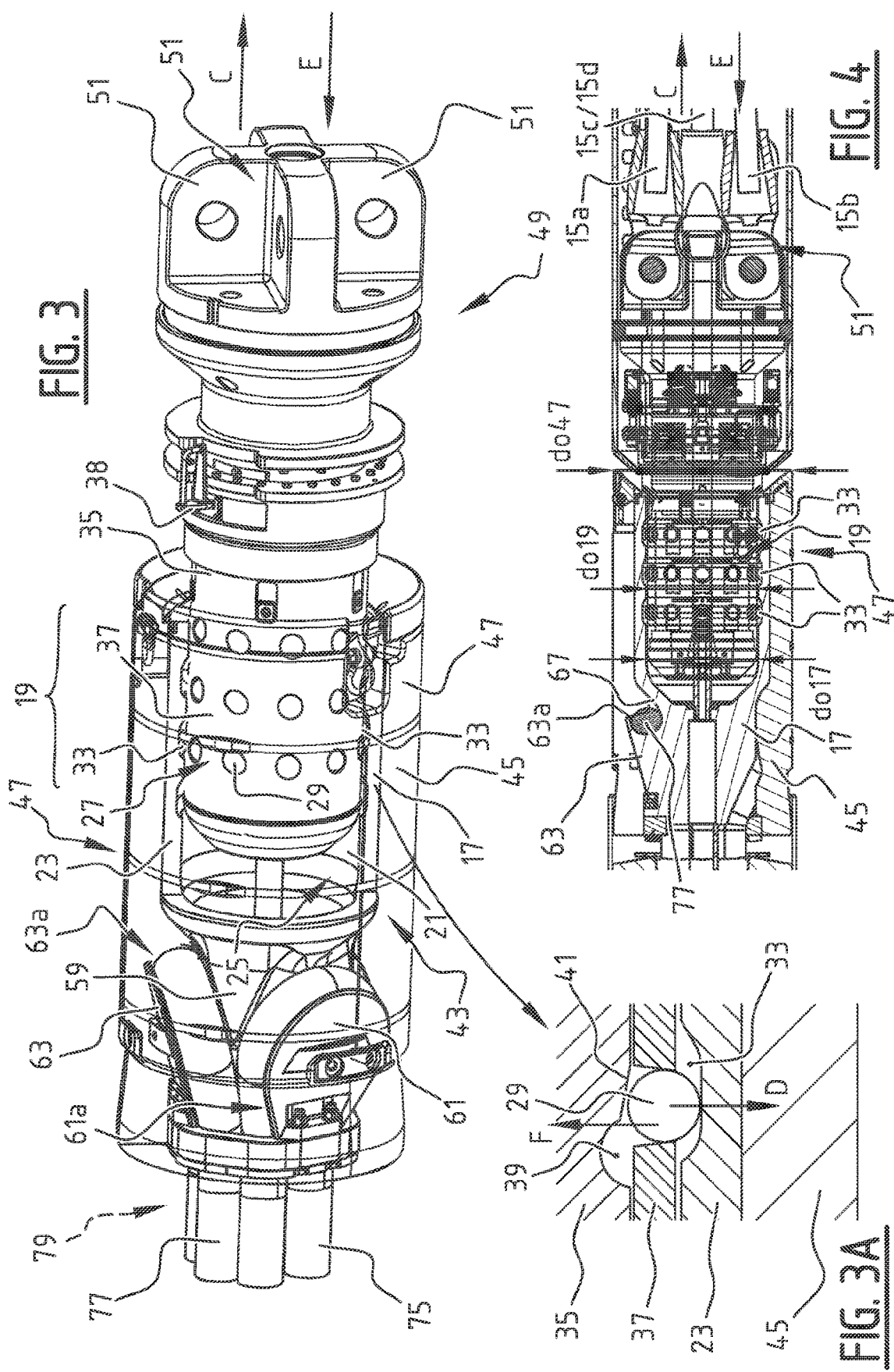

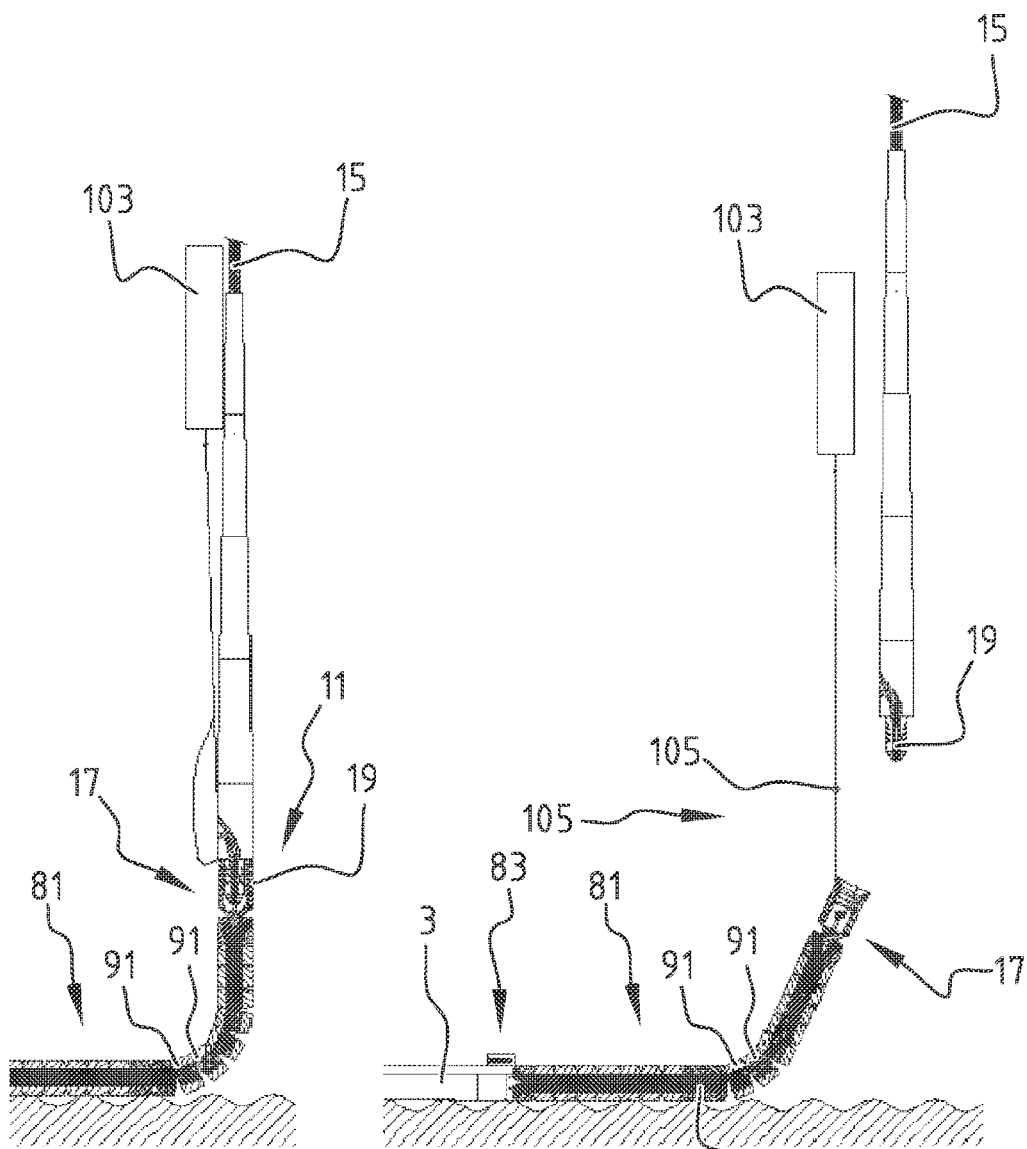

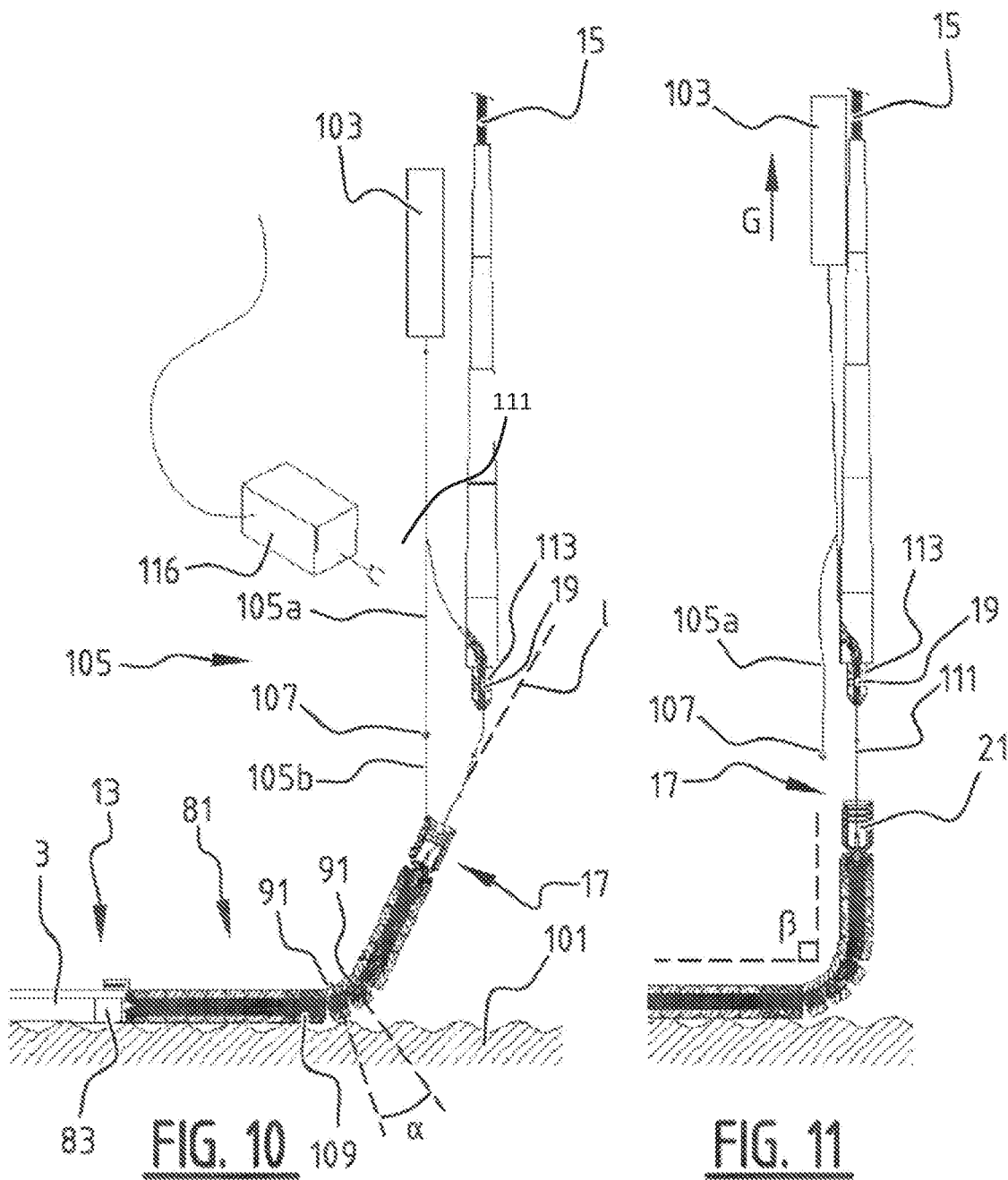

ABANDONMENT AND RECOVERY SYSTEM FOR A SUBSEA PIPELINE

This is a national stage application filed under 35 U.S.C. § 371 of pending international application PCT/NL2018/050182 filed Mar. 23, 2018, which claims priority to Netherlands patent application NL2018569, filed Mar. 23, 2017, the entirety of which applications are hereby incorporated by reference herein.

The present invention relates to abandonment and recovery of a subsea pipeline.

Subsea pipelines are laid on the seabed by pipe laying vessels, onboard which vessels lengths of pipe are connected, often welded, the one to the other to form a pipeline. Although reference is made herein below mostly to a welded connection, any connection between lengths of pipe may be formed, and the present disclosure is not limited to welded lengths of pipe. Upon connecting or welding lengths of pipe the one to the other, the lengths of pipe that have been connected the one to the other are lowered into the water and towards to seabed.

There are currently two main methods for laying a pipeline: the J-lay method and the S-lay method.

The J-lay method is commonly used for deepwater and ultra deepwater pipe laying. With this method a length of pipe is erected to a vertical position, connected or welded to the main pipeline and lowered directly into the water with a single bend, giving the pipeline which is being laid the form of a "J". On board the pipe laying vessel the pipeline is supported by a vertical orientated pipeline support structure that supports the pipeline and guides the pipeline into the water. The J-lay method can normally not be used for shallow/deep water, and is comparatively slow.

The S-lay method is commonly used for shallow water, deepwater and also ultra-deepwater pipe laying. With this method each length of pipe to be connected to the main pipeline is connected or welded thereto and moved starting from a horizontal orientation over a pipeline support structure, the so-called stinger, on which pipeline support structure the pipeline is bent in the direction of the seabed. While being lowered towards the seabed, the pipeline is forced into a second bend in opposite direction and is laid on the seabed in an orientation substantially parallel to the seabed. The double bend gives the pipeline which is being laid the form of an "S". The S-lay method is normally faster than the J-lay method, since there are many work stations.

Both in the J-lay method as in the S-lay method each length of pipe is after connecting or welding thereof to the main pipeline first led through a number of tensioners that clamp around the pipe near the vessel side end of the pipeline and can exert a pulling force on the pipeline.

When a pipeline being laid must be abandoned from a pipe laying vessel, e.g. in case of an upcoming storm, a typical method of abandonment of the pipeline consists of first welding a pipeline attachment, known as an A&R head, to the vessel side end of the pipeline. Subsequently, at least one A&R-cable that is with a first end thereof wound around the drum of a winch, is connected with the second end thereof to the A&R head by means of a releasable connector, typically a single hook or a C-hook, that is arranged on the second end of the A&R cable. After connection of the A&R-cable to the A&R-head, the vessel side end of the pipeline is lowered to the seabed by paying out the A&R-cable by means of the winch. When the vessel side end of the pipeline is on the seabed the cable is disconnected from the A&R-head and pulled in such that the vessel can sail away.

The abandoned pipeline is thereafter recovered by lowering the releasable connector, in particular a C-hook, that is arranged on the second end of the A&R cable towards the seabed. When the C-hook has almost reached the bottom, the vessel is positioned such that the hook is in the vicinity of a recovery sling that is connected to the A&R-head. Then a coupling operation is started, which operation has the goal to couple the C-hook to the recovery sling. This coupling operation is a so called "fishing"-operation, wherein the recovery sling is coupled to the hook by catching a loop of the recovery sling with the C-hook. To help catch the loop of the recovery sling, the loop of the recovery sling generally held up by means of a buoy. After catching the loop of the recovery sling with the C-hook, the actual recovery of the pipeline can start by pulling in the A&R-cable and thus pulling the end of the pipeline coupled to the A&R-cable towards the vessel.

Although the known A&R equipment, including the A&R head, the recovery sling, and the C-hook, are effective, a number of disadvantages are associated with the known A&R equipment. One disadvantage is that the known A&R equipment may damage the pipe support, the stinger and pipe other handling equipment on board the vessel and consequently also pipe lengths can be affected, when being transported there through. The pipe support, the stinger and other pipe handling equipment are primarily designed for supporting and handling pipe lengths, and having to handle the A&R equipment causes such problems. Furthermore, the above described "fishing"-operation with the known A&R equipment, wherein a recovery sling is caught by a C-hook, requires complex movements of the C-hook at the seabed.

Reference is made here to U.S. Pat. No. 5,318,384, relative to which at least the features in the appended independent claim are novel, since U.S. Pat. No. 5,318,384 discloses a bendable connection in the form of a shackle chain.

The present invention has as one of its objectives to address at least one of the above disadvantages of the known A&R equipment.

Thereto the present invention provides an abandonment and recovery system for a subsea pipeline.

The abandonment and recovery system according to the invention comprises a pipeline attachment assembly configured to be attached to a pipeline end; a cable attachment assembly configured to be attached to at least one abandonment and recovery cable; wherein the pipeline attachment assembly and the cable attachment assembly each comprise a respective one of two mating connector parts and a bendable connection in accordance with the appended independent claim. Since the exterior shape and size of the bendable connection are essentially constant, a contiguous outer surface is defined, contrary to the outer shape, form and size of a chain as in the prior art, while still bendable, in particular in relation to a size, shape and form of pipe handling elements and components of the pipe support, the stinger and pipe other handling equipment on board the vessel. Therefore, the bendable connection, when passing through the pipe handling elements and components of the pipe support, the stinger and other pipe handling equipment on board the vessel, will not cause damage thereto and fluent motion of the A&R system according to the present disclosure through the pipe support, the stinger and pipe other handling equipment on board the vessel, which are designed to process the lengths of pipe there through, is ensured.

Preferably, the two mating connector parts define a male/female-type connector. This allows the exterior of the coupling part to define an extension of the bendable connection in terms of the shape and size thereof and a further improvement is achieved to reduce damage to the pipe handling elements and components of the pipe support, the stinger and pipe other handling equipment on board the vessel, when the A&R system according the present disclosure passes there through.

The constant circumferential shape may comprise a form from a group of shapes, comprising cylindrical i.e. with a circular cross section, rotationally symmetrical, and polygonal. Other shapes may also be employed, wherein the outer surface of the bendable connection is consequently essentially contiguous, to present an essentially smooth running surface to the elements and components of the pipe support, the stinger and pipe other handling equipment on board the vessel.

Where, in the following disclosure, reference is made to cylindrical parts and elements, this is intended to encompass at least also rotationally symmetrical and polygonal circumferential shapes, also defining a cylindrical envelope.

In the known A&R equipment including a recovery sling and a C-hook, the side way orientated opening of the C-hook requires complex movement of the C-hook relative to the recovery sling for hooking the recovery sling to the C-hook. During the fishing operation for recovering the pipeline after abandonment, the complex movements of the C-hook that are associated with hooking the recovery sling to the C-hook at the seabed are done by moving the pipe-laying vessel at the sea surface. Initiating such complex movements of the C-hook at the seabed by moving the pipe-laying vessel at the sea surface is very difficult and time consuming. Furthermore, the recovery sling provides an abrupt change in radial dimensions between the pipeline and the C-hook that both have larger radial dimensions. This abrupt change in radial dimensions extends over a significant distance because of the length of the loop of the recovery sling that is required to allow for hooking the loop of the recovery sling to the C-hook. This abrupt change in radial dimensions over a significant distance, makes supporting and handling of the A&R equipment comprising a recovery sling and a C-hook on pipe supporting and pipe handling equipment on board the pipe laying vessel troublesome. As a consequence, individual pieces of support/handling equipment need to be designed to a disproportionately high margin of safety compared to normal pipe-lay, when deploying a conventional A&R system, which is no longer necessary as a result of the A&R system according to the present disclosure.

Relative to the known use of a recovery sling and a C-hook, the preferred use of a male/female-type connector according to the invention simplifies the movements of the connector parts the one relative to the other for subsea connecting and disconnecting, the pipeline attachment assembly that is attached to the pipeline and the cable attachment assembly that is attached to the A&R cable(s). Connecting merely requires aligning the connector parts and inserting the male connector part into the female connector part. As will be further explained herein below under reference to figures showing embodiments of the system according to the invention, connecting the connector parts of the male/female-type connector according to the invention requires less complex movements of the connector parts the one relative to the other than hooking a recovery sling to a C-hook according to the prior art. Furthermore, the use of a male/female-type connector according to the invention instead of the recovery sling and the C-hook takes away the abrupt change in radial dimensions that is associated with the recovery sling and the C-hook.

Furthermore, since the male/female connector of the system according to the invention does not require a side way orientated opening, the side surface(s) of the connector that are contacted by the pipe supporting and pipe handling equipment can be adapted to be more compatible with the pipe supporting and pipe handling equipment.

In a preferred embodiment of the system according to the invention, the connector has a cylindrical outer geometry. Such connector, that also can be referred to as a cylindrical connector, is as a result of its cylindrical outer geometry more adapted to pipe support and handling equipment on board a pipe laying vessel than a C-hook and recovery sling of the known A&R equipment. Preferably, the preferred male-female-type connector comprises a cylindrical outer surface. More preferably the cylindrical outer surface extends along the mating connector parts in mated state of the connector parts.

In particular the provision of a connector with a cylindrical geometry allows for gradual diameter changes along the pipeline attachment assembly and the cable attachment assembly, making the transition of the pipeline attachment assembly and the cable attachment assembly over and by pipe supporting and pipe handling equipment on board the vessel that is primarily designed for supporting and handling pipe less troublesome.

In an advantageous embodiment of the system according to the invention, the pipeline attachment assembly and the cable connector assembly have a cylindrical geometry. In a preferred embodiment thereof, in the mated state of the connector parts of the connector, the pipeline attachment assembly, the connector, and the cable attachment assembly provide a series of contiguous cylindrical outer surfaces that provide a gradual diameter transition from the end of the pipeline attachment assembly that is configured to be attached to a subsea pipeline, along the pipeline attachment assembly, the connector, and the cable attachment assembly.

According to a further advantageous embodiment of the system according to the invention, the pipe attachment assembly comprises one of the two connector parts; a pipeline attachment that is configured to be attached to a pipe section of a subsea pipeline; and a bendable connection that connects the pipeline attachment to the connector part, wherein the bendable connection has a cylindrical geometry, with a circular, rotationally symmetrical, polygonal or similar cross sectional shape. Preferably, the bendable, cylindrical connection is configured for allowing a bend of at least 90° and a radius defined in and/or by the bendable connection.

According to an advantageous embodiment, the outer dimension or outer diameter of the bendable, preferably cylindrical, rotationally symmetrical or polygonal connection is substantially the same as the outer dimension or outer diameter of the cylindrical, rotationally symmetrical or polygonal connector, to define a contiguous outer surface of practically the entire A&R system.

In a preferred embodiment of the system according to the invention wherein the pipeline attachment assembly comprises a bendable connection, the bendable connection comprises a plurality of adjoining bodies having a cylindrical geometry, with a circular, rotationally symmetrical, polygonal or similar cross sectional shape. Preferably, the plurality of adjoining bodies provide a series of contiguous cylindrical, rotationally symmetrical or polygonal outer surfaces. Preferably, the dimension or outer diameter of the cylindrical bodies is substantially the same as the dimension or outer diameter of the outer surface of the connector.

In an advantageous embodiment of the system wherein the pipeline attachment assembly comprises a bendable connection that comprises a plurality of adjoining cylindrical bodies, adjoining ends of adjoining cylindrical bodies have complementary shapes that cooperate to allow an articulation between adjoining cylindrical bodies. In a preferred embodiment thereof, the complementary shapes allow art articulation between adjoining cylindrical bodies comprised in the range of 5° to 15°, preferably 8° to 12°, most preferably an articulation of 10°.

In an advantageous embodiment of the system wherein the pipeline attachment assembly comprises a bendable, cylindrical, rotationally symmetrical or polygonal connection that comprises a plurality of adjoining cylindrical bodies, adjoining cylindrical, rotationally symmetrical or polygonal bodies are articulately connected the one to the other such that a series of U-joints, also known as universal joints, is provided.

In an alternative advantageous embodiment of the system wherein the pipeline attachment assembly comprises a bendable, cylindrical, rotationally symmetrical or polygonal connection that comprises a plurality of adjoining cylindrical bodies, the cylindrical, rotationally symmetrical or polygonal bodies have at least one of a spherical protrusion on one end and a spherical seat on the other end, such that the spherical protrusion of one of two adjoining cylindrical, rotationally symmetrical or polygonal bodies fits in the spherical seat of the other one of the two adjoining cylindrical, rotationally symmetrical or polygonal bodies thereby providing a spherical joint between the two adjoining cylindrical, rotationally symmetrical or polygonal bodies.

In an advantageous embodiment of the system whereon the pipeline attachment assembly comprises a bendable connection that comprises a plurality of adjoining cylindrical or polygonal bodies, at least one of the cylindrical, rotationally symmetrical or polygonal bodies is weighted relative to other ones of the cylindrical, rotationally symmetrical or polygonal bodies. Preferably, the weight of the weighted cylindrical, rotationally symmetrical or polygonal body is substantially greater than the weight of other, unweighted cylindrical, rotationally symmetrical or polygonal bodies. More preferably, the weighted cylindrical, rotationally symmetrical or polygonal bodies are approximately neutrally buoyant, whereas the weighted cylindrical, rotationally symmetrical or polygonal body is negatively buoyant. In a preferred embodiment thereof, between the at least one weighted cylindrical, rotationally symmetrical or polygonal body and the connector part of the pipeline attachment assembly there is a plurality of unweighted cylindrical, rotationally symmetrical or polygonal bodies, wherein preferably the plurality of unweighted cylindrical, rotationally symmetrical or polygonal bodies allow for a bend of at least 90°.

In an advantageous embodiment of the system wherein the pipeline attachment assembly comprises a bendable connection, the bendable connection comprises at least one sling extending through the cylindrical, rotationally symmetrical or polygonal elements from one end of the bendable connection to the other end, wherein the sling provides a loop on both ends of the bendable connection. In a preferred embodiment thereof, the sling is an endless loop sling.

In an advantageous embodiment of the system according to the invention wherein the pipeline attachment assembly comprises a bendable connection that comprises at least one sling, the pipeline attachment and the connector part are provided with hooks for connecting the at least one sling to the pipeline attachment and the connector part. Preferably, the hooks are arranged in an enclosure having a cylindrical outer surface wherein the diameter of the cylindrical, rotationally symmetrical or polygonal outer surface is substantially the same as the diameter of the cylindrical, rotationally symmetrical or polygonal bodies.

In preferred embodiments, the bendable connection may comprises three slings, wherein preferably for connecting the slings to the pipeline attachment and the connector part, the pipeline attachment and the connector part are provided with three hooks, wherein each hook has a hook body that protrudes from a respective surface of a base body, wherein the surfaces from which the hook bodies protrude correspond to surfaces of a tetrahedron. In a further preferred embodiment, the circumferential side surface of the protruding hook body is concave along at least a part of the circumferential length of the side surface, thereby providing a channel for the loop of one of the slings. Although three slings and associated hooks are preferred, alternatively the bendable connection has less or more than three slings and associated hooks.

In an advantageous embodiment of the system according to the invention wherein the pipeline attachment and the connector part are provided with three hooks, and each hook has a hook body that protrudes from a respective surface of a base body, wherein the surfaces from which the hook bodies protrude correspond to surfaces of a tetrahedron, the cross-section of each hook body in a plane parallel to the respective surface from which the hook body protrudes is drop shaped, wherein the drop point points away from the respective one of the pipeline attachment and the connector part.

According to a further advantageous embodiment of the system according to the invention, the pipeline attachment comprises a cylindrical body, wherein the outer diameter at the connector part end of the cylindrical body is substantially the same as the outer diameter of the cylindrical male/female connector. In a preferred embodiment thereof, the outer diameter at the pipeline end of the cylindrical and the outer diameter at the connector part end of the cylindrical body are different, and the cylindrical body tapers between the pipeline end and the connector part end.

According to a further advantageous embodiment of the system according to the invention, the cable attachment assembly comprises a cylindrical shell that at one end has substantially the same outer diameter as the outer diameter of the cylindrical outer surface of the cylindrical outer surface of the connector, and that least at the other end of the cylindrical shell tapers toward the central axis of the cylindrical shell.

According to a further advantageous embodiment of the system according to the invention, the system comprises a buoy and a connector wire configured for connecting the connector part of the pipeline attachment assembly to the buoy.

According to a further advantageous embodiment of the system according to the invention, the system comprises a guide wire that is at one end thereof connected to the connector part of the pipeline attachment assembly, preferably in or near the central longitudinal axis of the connector part; a guide conduit through the connector part of the cable attachment assembly that is configured to have the guide wire run there through, the guide conduit being arranged such that when the connector part of the cable attachment assembly is moved along the guide wire towards the end of the guide wire that is connected to the connector part of the pipeline attachment assembly, the connector part of the cable attachment assembly is guided to the connector part of the pipeline attachment for mating. In a preferred embodiment thereof, the guide wire is at the other end thereof connected to a buoy, preferably the same buoy as the one mentioned above. The male connector part is then free to move up and down with vessel motions, without significantly transferring motion to the female connector part, while minimising induced movements and facilitating rapid connection.

In an advantageous embodiment of the system according to the invention wherein the system is provided with a buoy, one of the pipeline attachment assembly and the cable attachment assembly is provided with a support frame for supporting the buoy. In a preferred embodiment thereof, the support frame is configured for releasable attaching the buoy thereon, and the support frame is rotatable mounted on the pipeline attachment or the cable attachment for rotation about the central longitudinal axis of the respective one of the pipeline attachment and the cable attachment. In an advantageous embodiment, the support frame comprises guide walls for guiding the support frame over pipeline support roller of a pipe laying vessel.

In an advantageous embodiment thereof one of the two mating connector parts comprises the cylindrical outer wall and a mating cavity inside the circumference of the cylindrical outer wall in which mating cavity the other one of the two mating connector parts is received in the mated state of the mating connector parts. In a preferred embodiment thereof the mating cavity and the connector part accommodated therein in the mated state of the mating connector parts are of complementary size and shape.

In an advantageous embodiment of the system according to the invention, at least one of the two mating connector parts comprises at least one protruding engaging member that engages the other one of the mating connector parts in the mated state of the mating connector parts. In a preferred embodiment thereof the engaging member is movable accommodated in an accommodation of the connector part that comprises the engaging member, which accommodation debouches at a surface of the connector part, wherein the engaging member is selectively movable between an engage state and a release state, wherein in the engage state the engaging member protrudes from the surface of the connector part. According to an advantageous embodiment only one of the mating connector parts comprises the selectively movable engaging members, wherein the cable attachment assembly comprises the connector part that comprises the selectively movable engaging members.

In a preferred embodiment of the system according to the invention wherein at least one of the connector parts comprises at least one movable engaging member, the engaging member is a ball. Alternatively, the at least one movable engaging member is a gripping tooth or a latching plate.

In an advantageous embodiment of the system according to the present invention wherein at least one of the connector parts comprises at least one protruding engaging member, the protruding engaging member is one of two cooperating engaging members each arranged on a respective one of the two mating connector parts. In a preferred embodiment thereof, one of the two cooperating engaging members is a movable ball in accordance with an embodiment described herein above, whereas the other one of the two cooperating engaging members is a ball seat configured to be engaged by the ball in the mated state of the mating connector parts, wherein the seat is preferably one of a spherical indentation or a circumferential groove. Alternatively, the at least one movable engaging member is a gripping tooth or a latching plate, and the cooperating engaging member is a circumferential groove that can be engaged by the at least one gripping tooth or latching plate. According, to a further alternative the protruding engaging member is one of two cooperating engaging members of a bayonet-type connector.

The accompanying drawings are used to illustrate non-limitative preferred exemplary embodiments of the present invention. The above stated and other advantages, features and objectives of the invention will become more apparent, and the invention better understood, from the following detailed description when read in combination with the accompanying drawings, wherein:

FIG. 2 shows a longitudinal section of the system of FIG. 1;

FIG. 3 shows a perspective view with parts taken away of a male/female-type connector of the system of FIG. 1;

FIG. 3A shows a longitudinal section of a detail of the male/female-type connector of the system of FIG. 1;

FIG. 4 shows a longitudinal section of the mate/female-type connector of FIG. 3;

FIGS. 6A and 6B show longitudinal section views of a bendable connection of the system of claim 1;

FIGS. 8 and 9 show in side view with parts taken away, the system of FIG. 1 at the seabed in two situations during an abandonment operation;

FIGS. 10 and 11 show in side view with parts taken away, the system of FIG. 1 at the seabed in two situations during a recovery operation.

Figure 1:
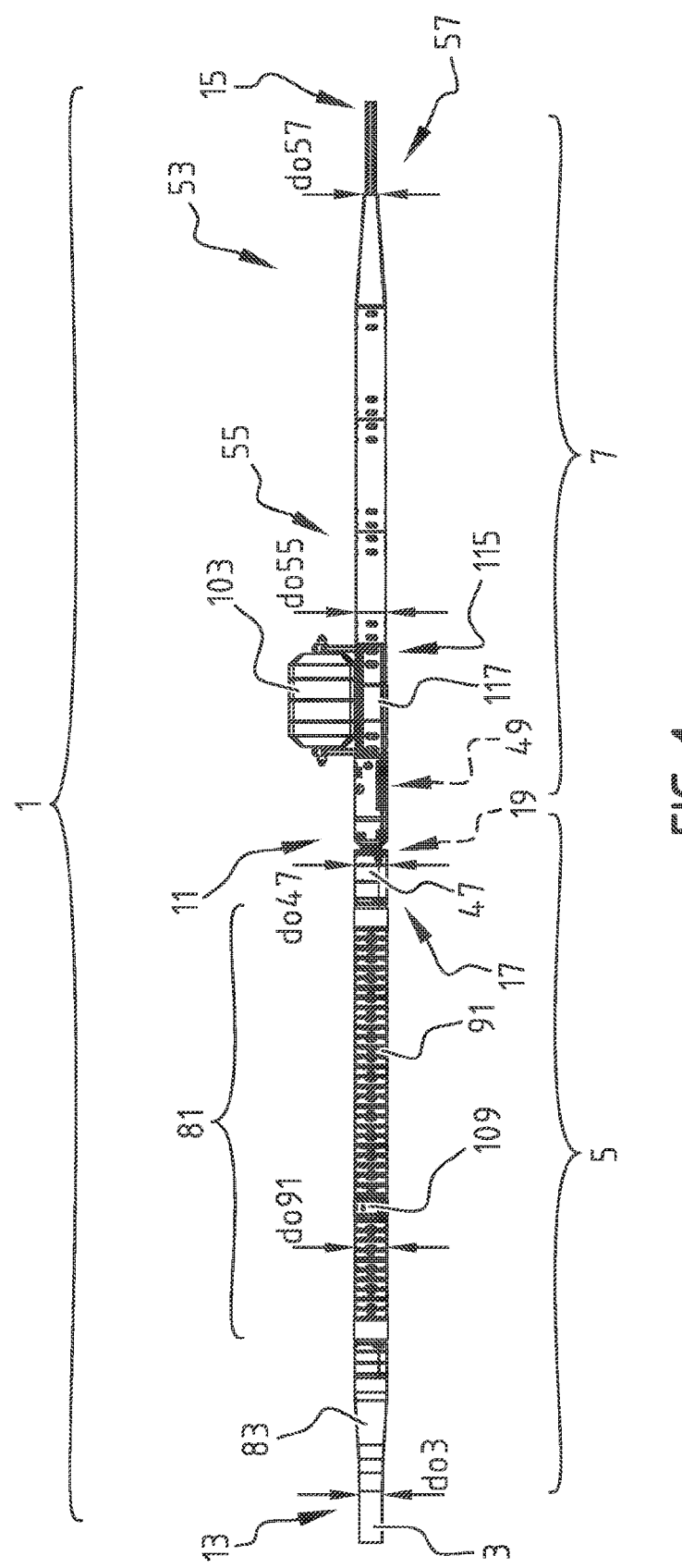
FIG. 1 shows a side view of an embodiment of the system according to the invention.

FIGS. 1 and 2 show an embodiment of an abandonment and recovery system 1 according to the invention for a subsea pipeline 3. The system 1 is shown with a pipeline attachment assembly 5, a cable attachment assembly 7, and a male/female-type connector 11 having a cylindrical geometry, hereinafter referred to as cylindrical connector 11.

The pipeline attachment assembly 5 is attached to end 13 of the subsea pipeline 3. The cable attachment assembly 7 is attached to respective cable ends of a set 15 of four abandonment and recovery (A&R) cables. The other ends of the set 15 of A&R-cables are each wound on a respective A&R-winch spool on board a pipe laying vessel 95 (shown in FIG. 7).

In FIGS. 1 and 2, the cylindrical connector 11 connects the cable attachment assembly 7 to the pipeline attachment assembly 5. The set 15 of A&R-cables 15 is thus connected to the subsea pipeline 3 via respectively the cable attachment assembly 7, the cylindrical connector 11, and the pipeline attachment assembly 5.

The cylindrical connector 11 comprises two mating connector parts: a female connector part 17 and a male connector part 19. The female connector part 17 is comprised by the pipeline attachment assembly 5. The male connector part 19 is comprised by the cable attachment assembly 7. In FIGS. 1 and 2, the female connector part 17 and the male connector part 19 are in a mated state.

In FIGS. 3 and 4, the cylindrical connector 11 is shown in more detail. In FIG. 3 the female connector part 17 and the male connector part 19 in unmated state. The male connector part 19 is being inserted in and being received by a mating cavity 21 inside the circumference of the cylindrical outer wall 23 of the female connector part 17. The mating cavity 21 of the female connector part 17 has a cylindrical inner mating surface 25, whereas the male connector part 19 has a cylindrical outer mating surface 27. The outer diameter do19 of the outer mating surface of the male connector part 19 closely fits the inner diameter di17 of the inner mating surface of the mating cavity 21 of female connector part 19.

The male connector part 19 comprises a plurality of balls 29 that are each movable arranged in a respective accommodation 31. In the shown mated state of the connector parts 17, 19, shown in FIG. 4, the balls 29 protrude from the cylindrical outer mating surface 27 of the male connector part 19 into circumferential grooves 33 that are provided the inner mating surface 25 of the mating cavity 21 of the female connector part 17. The balls 29 and the circumferential grooves 33 are cooperating engaging members that provide that in the mating state of the connector parts 17 and 19 wherein the balls 29 extend into the circumferential grooves 33, the female connector part 17 is engaged by the male connector part 19. The connector parts 17 and 19 are thus connected.

For disconnecting the connector parts 17, 19, the balls 29 need to be moved out of the circumferential grooves 33 and into the accommodations 31. The cylindrical connector 11 shown in FIGS. 3 and 4 is selectively operable for disconnecting the connector parts 17, 19. Thereto the male connector part 19 comprises a cylindrical mandrel 35 and a cylindrical sleeve 37 that is coaxially arranged on the cylindrical outer surface of the mandrel 35 for sliding over the cylindrical outer surface of the mandrel 35 in axial direction. The sleeve 37, that is also referred to as ball cage, is provided with through holes that each provide one of the accommodations 31. The mandrel 35 is provided with ball seats 39 in the cylindrical outer surface thereof that each are aligned with a respective accommodation 31. Each ball 29 accommodated in an accommodation 31 cooperates with the respective ball seat 39 that is aligned with the respective accommodation 31. The ball seat 39 is provided with a slanted control surface 41 that when the mandrel 35 is moved relative to the sleeve 37 in the axial direction indicated with arrow E, contacts the ball 29 cooperating therewith and forces the ball 29 in outward radial direction indicated with arrow D. When the mandrel 35 is moved relative to the sleeve 37 in the opposite axial direction indicated with arrow C, the slanted control surface 41 of the ball seat 39 is moved away from the ball 29 cooperating therewith, thereby allowing the ball 29 to move into the accommodation 31 in the radial direction indicated by arrow F. This allows the balls 29 to be moved out of the circumferential grooves 33 and the connector parts 17, 19 to be disconnected. The male connector part 19 is provided with a selectively operable lock, that is configured for locking axial movement of the sleeve 37 relative to the mandrel 35. The selectively operable lock can be operated by means of handle 38.

As shown in FIGS. 3 and 4, the female connector part 17 comprises a cup shaped body 43 in which the mating cavity 21 is arranged. On the cylindrical outer surface of the cup shaped body 43 a spacer sleeve 45 is fixed that provides a cylindrical outer surface 47 of the cylindrical connector 11. In the mated state of the connector parts 17 and 19, as shown in FIG. 4, the cylindrical outer surface 47 extends along the connector parts 17, 19. The cylindrical outer surface 47 has an outer diameter d047.

As shown in FIGS. 3 and 4, the male connector part 19 is attached to a cable attachment 49 comprised by the cable attachment assembly 7, The cable attachment 49 is provided with lugs 51, in particular four lugs, which are each configured for coupling a respective A&R cable 15a, 15b, 15c, 15d thereto. As shown in FIGS. 1 and 2, the cable assembly 7 further comprises a cylindrical shell 53 that at one end 55, adjacent the cylindrical connector 11, has an outer diameter do55 that is the same as, or substantially the same as, the outer diameter do47 of the cylindrical outer surface 47 of the cylindrical connector 11. The cylindrical shell 53 tapers towards the opposite end 57 of the cylindrical shell 53 away from the cylindrical connector 11, such that the outer diameter do57 at the opposite end 57 is smaller than the outer diameter do55 at the end 55 adjacent the cylindrical connector 11. In particular, the outer diameter do57 at the end 57 approaches the outer diameter of the bundle provided by the set 15 of A&R-cables. The cylindrical shell 53 thus provides a smooth transition to the outer diameter do47 of the cylindrical outer surface 47. Thus the A&R cables 15 are coupled to the cable attachment 49 to which attachment 49 the male connector part 19 is attached. The A&R cables 15 pass through the cylindrical shell 53 that extends along the cable attachment 49 and away from the male connector part 19.

As shown in FIGS. 3 and 4, the cup shaped body 43 of the female connector part 17 is attached to a base body 59. The base body 59 has arranged thereon three hook bodies 61, 63, 65. Each book body 61, 63, 65 protrudes from a respective surface 67, 71, 73 of the base body 59, wherein each surface corresponds to a surface of a tetrahedron. Each hook body 61, 63, 65 has a cross-section in a plane parallel to the respective surface 67, 71, 73 from which the hook body 61, 63, 65 protrudes that is drop shaped, wherein the drop point points away from the female connector part 17, The circumferential side surface 61a, 63a, 65a of the protruding hook bodies 61, 63, 65 is concave. Each of the concave side surfaces 61a, 63a, 65a, provide a channel for one of the three slings 75, 77, 79 of a bendable connection 81 that, as shown in FIGS. 1 and 2, is comprised by the pipeline attachment assembly 5. As shown in FIGS. 3 and 4 a sling binding ring 82 is provided for binding the slings 75, 77, 79 together and preventing the slings 75, 77, 79 from unhooking. As shown in FIGS. 3 and 4 the spacer sleeve 45 that provides the cylindrical outer surface 47 of the cylindrical connector 11 extends over the hook bodies 61, 63, 65.

Figure 5:
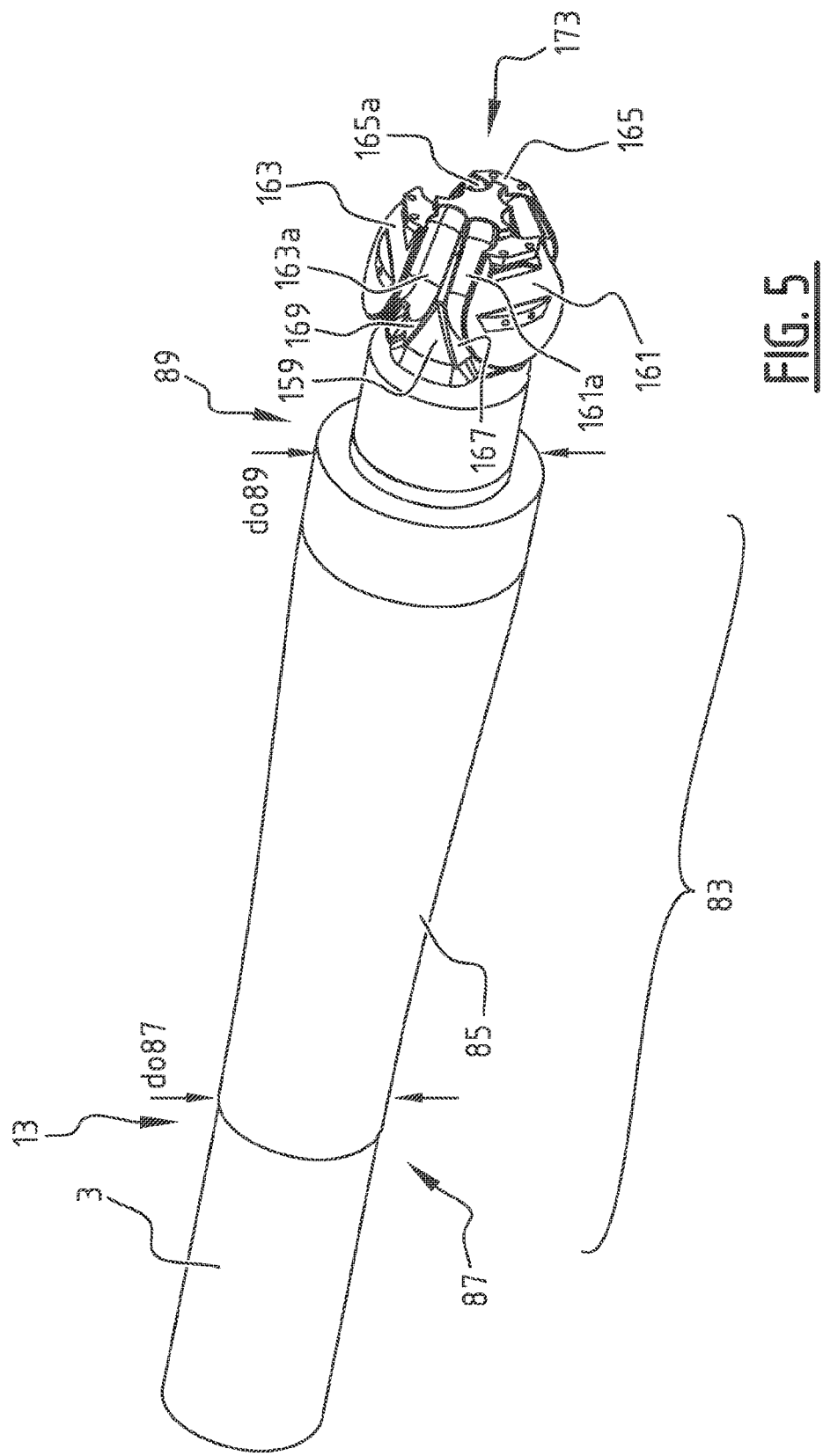
FIG. 5 shows a perspective view of a pipeline attachment of the system of claim 1.

The bendable connection 81 connects the female connector 17 to a pipeline attachment 83. The pipeline attachment 83 comprises a cylindrical body 85 that at one end 87 is fixed to the end 13 of the subsea pipeline 3. In particular the tapered cylindrical body 85 is welded to the end 13 of the subsea pipeline 3. As shown in FIG. 5, the opposite end 89 the cylindrical body 85 is attached to a base body 159. The base body 159 has arranged thereon three hook bodies 161, 163, 165. Each hook body 161, 163, 165 protrudes from a respective surface 167, 171, 173 of the base body 159, wherein each surface corresponds to a surface of a tetrahedron. Each hook body 161, 163, 165 has a cross-section in a plane parallel to the respective surface 167, 171, 173 from which the hook body 161, 163, 165 protrudes that is drop shaped, wherein the drop point points away from the pipeline attachment 83. The circumferential side surface 161a, 163a, 165a of the protruding hook bodies 161, 163, 165 is concave. Each of the concave side surfaces 161a, 163a, 165a, provide a channel for one of the three slings 75, 77, 79 of the bendable connection 81 that, as shown in FIGS. 1 and 2, is comprised by the pipeline attachment assembly 5.

Figure 6:
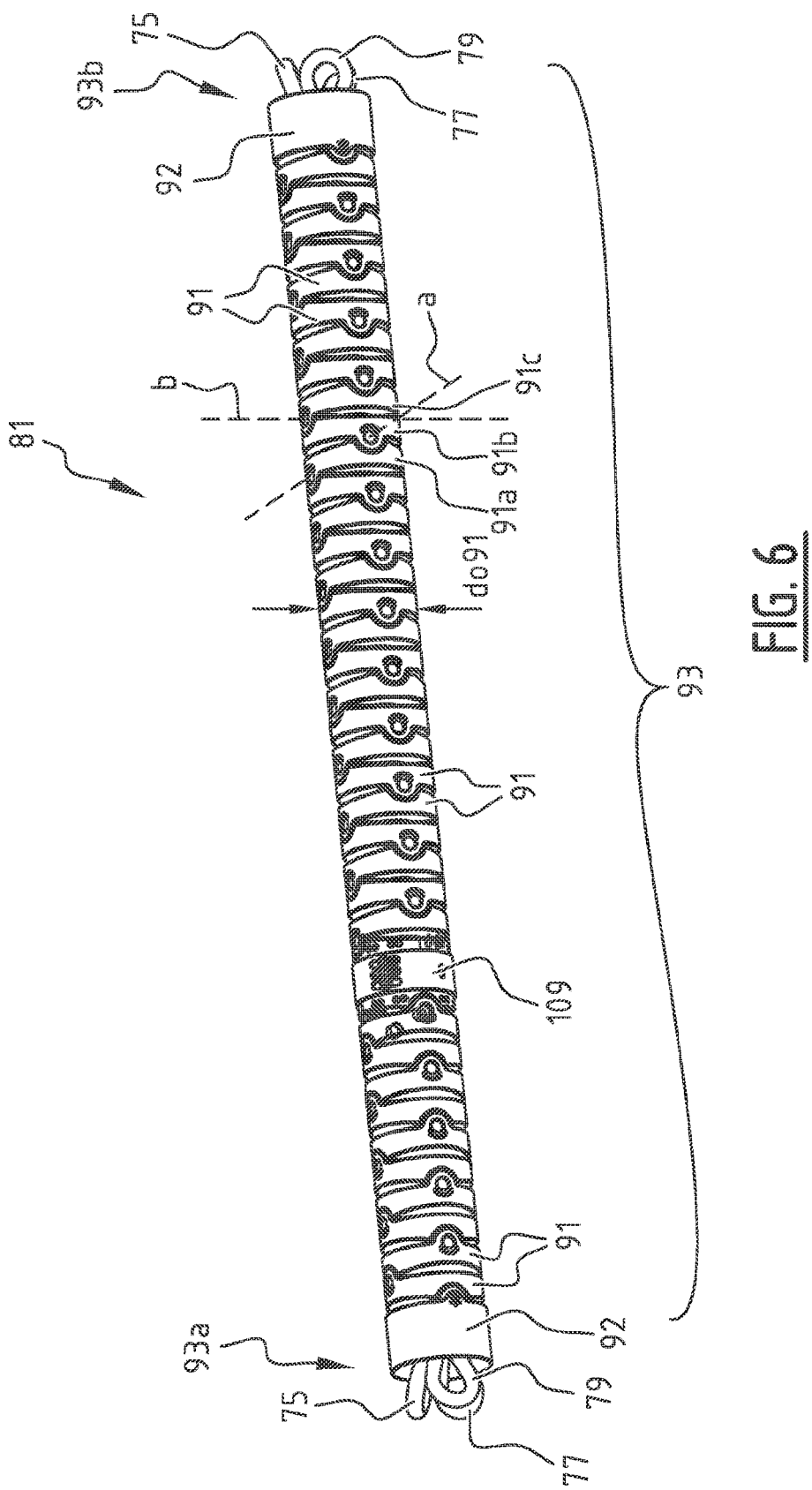
FIG. 6 shows a perspective view of a bendable connection of the system of claim 1.

As shown in FIGS. 1 and 2 and in FIGS. 6A and 6B, the bendable connection 81 comprises a plurality of adjoining cylindrical bodies 91. The adjoining cylindrical bodies 91 provide a row 93 of cylindrical bodies 91. Each of the cylindrical bodies 91 has a central through hole through which the three slings 75, 77, 79 extend. The slings 75, 77, 79 are endless loop slings that each provide a respective loop adjacent each of the ends 93a, 93b of the row 93 of cylindrical bodies 91.

The outer diameter do91 of each of the cylindrical bodies 91 is the same, or at least substantially the same, thereby providing a series of contiguous cylindrical outer surfaces. Referring to FIG. 6A, the outer diameter do91 of the cylindrical bodies 91 is the same as, or substantially the same as, the outer diameter do47 of the cylindrical outer surface 47 of the cylindrical connector 11. As shown in FIGS. 6A and 6B, a transition sleeve 92 is provided on the end 93b of the row 93 of cylindrical bodies 91 that provides a smooth transition between the cylindrical outer surface of the cylindrical body 91 at the end 93b of the row 93 and the outer surface of the spacer sleeve 45 that provides the cylindrical outer surface 47 of the cylindrical connector 11.

Furthermore, referring to FIG. 6B, the outer diameter do89 of the cylindrical body 85 of the pipeline attachment 83, at the end 89 adjacent the bendable connection 81 is the same as, or substantially the same as, the outer diameter do91 of the cylindrical bodies 91. As shown in FIGS. 6A and 6B, a transition sleeve 92 is provided on the end 93a of the row 93 of cylindrical bodies 91. Together with the outer surface of the spacer sleeve 46 that is provided at the end 89 of the pipe attachment 83 and extends along the hook bodies 161, 163, 165, the transition sleeve 92 provides a smooth transition between the cylindrical outer surface of the cylindrical body 91 at the end 93a of the row 93 and the cylindrical outer surface of the cylindrical body 85 of the pipeline attachment 83.

This provides a smooth transition between the outer surface of the cylindrical bodies 91 and the pipeline attachment 83. As shown in FIG. 5, the outer diameter do87 at the opposite end 87 of the cylindrical body 85 of the pipeline attachment 83 is the same as, or substantially the same as, the outer diameter do3 of the subsea pipeline 3. Since the outer diameter do89 at one end 89 of the cylindrical body 85 of the pipeline attachment 83 is greater than the outer diameter do87 at the other end 87, the cylindrical body 85 is tapered to provide a smooth transition between the outer surface of the subsea pipeline 3 and the outer surface of the cylindrical bodies 91 of the bendable connection 81.

Figure 7:
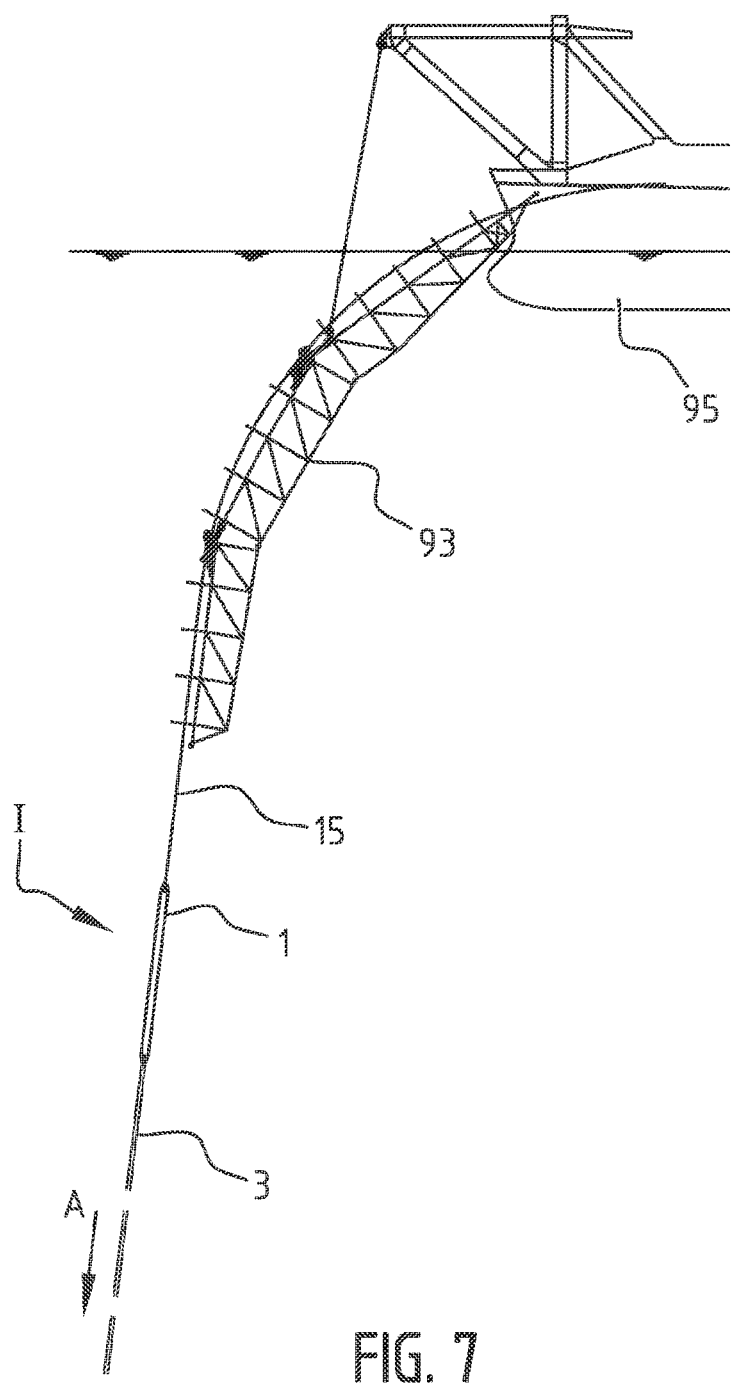
FIG. 7 shows a side view of a part of a pipe laying vessel during use of the system of FIG. 1.

Thus, referring to FIG. 1, in the mated state of the connector parts 17, 19, the pipeline attachment 83, the bendable connection 81, the cylindrical connector 11, and the cylindrical shell 53, provide a series of cylindrical outer surfaces that provides a smooth transition front the outer surface of the subsea pipeline 3, along the pipeline attachment assembly 5, the cylindrical connector 11, and the cable attachment assembly 7 to the set of A&R-cables 15. Referring to FIG. 7, this advantageously facilitates a smooth transition of the pipeline attachment assembly 5, the cylindrical connector 11, and the cable attachment assembly 7 over a stinger 93 of a pipe laying vessel 95 during abandonment and recovery of the subsea pipeline 3.

Referring to FIGS. 1, 2 and 6A and 6B, adjoining ends of adjoining cylindrical bodies 91 of the bendable connection 81 have complementary shapes that cooperate to allow an articulation between adjoining cylindrical bodies 91. As shown adjoining cylindrical bodies 91 are articulately connected the one to the other such that a series of U-joints, also known as universal joints, is provided. In particular, for each series of three adjoining cylindrical bodies 91a, 91b, 91c, the middle cylindrical body 91b is hingedly connected to one 91a of the other cylindrical bodies for hinging about a first hinge axis a, whereas the middle cylindrical body 91b is hingedly connected to the other one 91c of the other cylindrical bodies for hinging about a second hinge axis b, wherein the first hinge axis a and second hinge axis b extend perpendicular the one relative to the other. In an alternative embodiment (not shown) the cylindrical bodies 91 have a spherical protrusion on one end and a spherical seat on the other end, such that the spherical protrusion of one of two adjoining cylindrical bodies fits in the spherical seat of the other one of the two adjoining cylindrical bodies thereby providing a spherical joint between the two adjoining cylindrical bodies instead of a U-joint.

Referring to FIG. 10, in the embodiment shown in FIGS. 6A and 6B, each spherical joint allows for an articulation α between adjoining cylindrical bodies 91 of 10°. As shown in FIG. 11, the bendable connection 81 allows for an arched bend β of at least 90°.

As shown in FIGS. 1 and 2, the system 1 comprises a buoy 103. As will be further explained herein below under reference to FIGS. 8 to 11, the buoy 103 is used during disconnecting and connecting operations. When the buoy 103 is not used, the buoy 103 is releasable arranged on a support frame 115 that is arranged on the cylindrical shell 53 of the cable attachment assembly 7. The support frame 115 is rotatable mounted on the cylindrical shell 53 for rotation about the central longitudinal axis of the cable attachment assembly 7. The support frame 115 comprises guide walls 117 for guiding the support frame 115 over pipeline support rollers 119 arranged on the stinger 93 of a pipe laying vessel 95 shown in FIG. 7.

By means of FIGS. 8 and 9 disconnecting the set 15 of A&R cables from the pipeline 3 is illustrated during abandonment operation after the pipeline 3 has been laid down on the seabed 101. In FIG. 8 is shown that after lying down the pipeline 3 on the seabed 101, the buoy 103 has been released from its support frame 115. The buoy 103 is connected to the female connector part 17 by means of a cable 105. In FIG. 8 is illustrated that once the buoy 103 is released, the buoy 103 pulls the female connector part 17 upwards, thereby axially moving the sleeve 37 of the male connector part 19 (shown in FIGS. 3 and 4) in the direction of arrow C relative to the mandrel 35 of the male connector part 19. The sleeve 37 of the male connector part 19 is subsequently engaged by the lock provided in the male connector part 19 in a position relative to the mandrel 35 in which position the balls 29 can be moved out of the circumferential grooves 33 of the female connector part 17 into the accommodation 31. This allows to subsequently pull the male connector part 19 out of the mating cavity 21 of the female connector part 17 by pulling the set 15 of A&R cables in. As shown in FIG. 9, once the male connector part 19 has been pulled out of the mating cavity 21 the female connector part 17, the buoy 103 holds the female connector part 17 in an upward orientation with the mating cavity 21 directed upwards, ready to receive therein the male connector part 19 during the recovery operation.

In FIGS. 10 and 11 connecting the set 15 of A&R cables to the pipeline 3 during recovery operation of the pipeline 3 that lays abandoned on the seabed 101. In FIG. 10, the end 13 of the subsea pipeline 3 is lying abandoned on the seabed 101. The connector parts 17, 19 are disconnected. The female connector part 17 is held in an upward orientation by means of a buoy 103 that is connected to the female connector part 17 by means of a cable 105. The cable 105 comprises two cable parts 105a, 105b that are coupled by means of a selectively releasable coupling 107.

Referring to FIG. 10 and FIGS. 6A and 6B, one of the cylindrical bodies 91 of the bendable connection 81, referred to as weighted cylindrical body 109, is provided with weight that causes the weighted cylindrical body 109 and the cylindrical bodies 91 between the weighted cylindrical body 109 and the pipeline attachment 83 to remain lying on the seabed while the buoy 103 bends the part of the bendable connection 81 between the weighted cylindrical body 109 and the female connector part 17 such that the female connector part 17 is in an upward orientation with the mating cavity 21 directed upwards, ready to receive therein the male connector part 19. As shown in FIG. 10 for guiding the male connector part 19 into the mating cavity 21, first a guide wire 111 that is at one end thereof connected to the female connector part 17, in or near the central longitudinal axis 1 of the female connector part 17, is run through a guide conduit 113 that extends through the male connector part 19. In the shown embodiment, the guide wire 111 is run through the guide conduit 113 by an ROV 115. Subsequently, the ROV 115 operates the selectively releasable coupling 107 of the cable 105, thereby disconnecting the cable connection between the buoy 103 via cable 105. The buoy 103 will then rise in the direction of arrow F and pull the guide wire 111 tight as shown in FIG. 11, such that the male connector part 19 and the mating cavity 21 of the female connector part 17 are aligned for mating. Subsequently, by paying out the set 15 of A&R-cables, the male connector part 19 is lowered and guided along the guide wire 111 into the mating cavity 21 of the female connector part 17. While the male connector part 19 is inserted in the mating cavity 21, the sleeve 37 the balls 29 of the male connector part 19 are caused to protrude out of the cylindrical surface 27 of the mate connector part 19 and into the circumferential grooves 33 of the female connector part 17, such that the male connector part 19 and the female connector part 17 are connected once the male connector part 19 is fully inserted in the mating cavity 21 of the female connector part 17. Thus a connection between the abandoned subsea pipeline 3 and the set 15 of A&R-cables is established.

In case after establishing the connection between the abandoned subsea pipeline 3 and the set 15 of A&R-cables, the pipe laying vessel from which the set 15 of A&R cables are suspended makes a substantial heave motion causing the mated connector parts 17, 19 to be pulled upwards, the part of the bendable connection 81 between the weighted cylindrical body 109 and the pipeline attachment 83 that remained on the seabed, serves as a heave compensator. A sudden substantial upward motion of the female connector part 17 causes the weighted cylindrical body 109 to leave the seabed to move upwards, thereby preventing the end 3 of the pipeline 3 from being picked up laterally. It is noted that also during the abandonment operation after the pipeline has been laid down on the seabed and before the male connector part 19 and female connector part 17 are unmated, such as in the situation shown in FIG. 8, the weighted cylindrical body 109 provides the same heave compensation.

Although the principles of the invention have been set forth above with reference to specific embodiments, it must be understood that this description is given solely by way of example and not as limitation to the scope of protection, which is defined by the appended claims.

The invention claimed is:

1. An abandonment and recovery system for a subsea pipeline, comprising:
 a pipeline attachment assembly configured to be attached to a pipeline end; and
 a cable attachment assembly configured to be attached to at least one abandonment and recovery cable;
 wherein the pipeline attachment assembly and the cable attachment assembly each comprise a respective one of two mating connector parts forming a connector for releasable connection of the pipeline attachment assembly and the cable attachment assembly to each other, wherein during abandonment the mating connector parts are released for the pipeline attachment assembly to remain attached to the pipeline and for recovery the mating connector parts are re-connected, and wherein the pipeline attachment assembly comprises:
 the one of the two mating connector parts of the connector;
 a pipeline attachment that is configured to be attached to a pipe section of a subsea pipeline; and
 a bendable connection that connects the pipeline attachment to the one of the two connector parts of the pipe attachment assembly over a distance,
 wherein the bendable connection has, over a longitudinal length thereof, a constant circumferential shape and an essentially constant size.

2. The abandonment and recovery system according to claim 1, wherein the constant circumferential shape comprises a form selected from a group of rotationally symmetrical shapes including cylindrical and polygonal.

3. The abandonment and recovery system according to claim 1, wherein:
 the connector has a cylindrical or polygonal geometry, and
 wherein the pipeline attachment assembly and the cable attachment assembly have a cylindrical or polygonal geometry.

4. The abandonment and recovery system according to claim 1, wherein in the mated state of the connector parts of the connector, the pipeline attachment assembly, the connector, and the cable attachment assembly provide a series of contiguous rotationally symmetrical outer surfaces that provide a gradual diameter transition from the end of the pipeline attachment assembly that is configured to be attached to a subsea pipeline, along the pipeline attachment assembly, the connector, and the cable attachment assembly.

5. The abandonment and recovery system according to claim 1, wherein:
 the bendable connection comprises at least one sling extending through the rotationally symmetrical elements from one end of the bendable connection to the other end, wherein the sling provides a loop on both ends of the bendable connection,
 the sling is an endless loop sling,
 for connecting the sling to the pipeline attachment and the connector part, the pipeline attachment and the connector part are provided with a hook,
 the bendable connection comprises three slings;
 for connecting the slings to the pipeline attachment and the connector part, the pipeline attachment and the connector part are provided with three hooks, wherein each hook has a hook body that protrudes from a respective surface of a base body, wherein the surfaces from which the hook bodies protrude correspond to surfaces of a tetrahedron,
 the circumferential side surface of the protruding hook body is concave along at least a part of the circumferential length of the side surface, thereby providing a channel for the loop of one of the slings, and
 the cross-section of each hook body in a plane parallel to the respective surface from which the hook body protrudes is drop shaped, wherein the drop point points away from the respective one of the pipeline attachment and the connector part.

6. The abandonment and recovery system according to claim 1, wherein:
the connector comprises a cylindrical or polygonal outer surface that extends along the mating connector parts in mated state of the connector parts,
one of the two mating connector parts comprises the rotationally symmetrical outer wall and a mating cavity inside the circumference of the rotationally symmetrical outer wall in which mating cavity the other one of the two mating connector parts is received in the mated state of the mating connector parts, and
the mating cavity and the connector part received therein in the mated state of the mating connector parts are complementary in size and shape.

7. The abandonment and recovery system according to claim 1, wherein:
at least one of the two mating connector parts of the connector comprises at least one protruding engaging member that engages the other one of the mating connector parts of the connector in the mated state of the mating connector parts,
the engaging member is movable accommodated in an accommodation of the connector part that comprises the engaging member, which accommodation debouches at a surface of the connector part, wherein the engaging member is selectively movable between an engage state and a release state, wherein in the engage state the engaging member protrudes from the surface of the connector part,
only one of the mating connector parts comprises the selectively movable engaging member, wherein the cable attachment assembly comprises the connector part that comprises the selectively movable engaging members,
the engaging member is a ball,
the protruding engaging member is one of two cooperating engaging members each arranged on a respective one of the two mating connector parts, and
the other one of the two cooperating engaging members is a ball seat configured to be engaged by the ball in the mated state of the mating connector parts, wherein the ball seat is one of a spherical indentation or a circumferential groove.

8. The abandonment and recovery system according to claim 1, wherein:
the connector has a rotationally symmetrical geometry; and
the cable attachment assembly comprises a shell having a rotationally symmetrical geometry that at one end has substantially the same outer diameter as the outer diameter of the connector, and that at the other end of the cylindrical shell tapers toward a central axis of the rotationally symmetrical shell.

9. The abandonment and recovery system according to claim 1, wherein:
the connector has a rotationally symmetrical geometry;
the pipeline attachment comprises a body having a rotationally symmetrical geometry, wherein the outer diameter at the connector part end of the cylindrical body is substantially the same as the outer diameter of the connector, and
the outer diameter at the pipeline end of the rotationally symmetrical body and the outer diameter at the connector part end of the rotationally symmetrical body are different, and the rotationally symmetrical body tapers between the pipeline end and the connector part end.

10. The abandonment and recovery system according to claim 1, comprising a buoy and a connector wire configured for connecting the one of the two mating connector parts of the connector of the pipeline attachment assembly to the buoy.

11. The abandonment and recovery system according to claim 1, comprising:
a guide wire that is at one end thereof connected to the one of the two mating connector parts of the connector of the pipeline attachment assembly, in or near the central longitudinal axis of the one of the connector parts; and
a guide conduit through the connector part of the cable attachment assembly that is configured to have the guide wire run there through, the guide conduit being arranged such that when the connector part of the cable attachment assembly is moved along the guide wire towards the end of the guide wire that is connected to the connector part of the pipeline attachment assembly, the connector part of the cable attachment assembly is guided to the connector part of the pipeline attachment for mating.

12. The abandonment and recovery system according to claim 11, wherein the guide wire is at the other end thereof connected to a buoy.

13. The abandonment and recovery system according to claim 11, wherein the pipeline attachment of the pipeline attachment assembly is provided with a support frame for supporting the buoy.

14. The abandonment and recovery system according to claim 13, wherein a pipeline attachment assembly or the cable attachment assembly is provided on an outer surface with a support frame for the buoy, wherein the support frame is configured for releasable attaching the buoy thereon, and wherein the support frame is rotatable mounted on the outer surface for rotation about the central longitudinal axis of the respective one of the pipeline attachment assembly and the cable attachment assembly.

15. The abandonment and recovery system according to claim 14, wherein the support frame comprises guide walls for guiding the support frame over pipeline support rollers of a pipe laying vessel.

16. The abandonment and recovery system according to claim 1, wherein the bendable connection is configured for allowing a bend of at least 90° and a radius configured for pipe laying.

17. The abandonment and recovery system according to claim 1, wherein:
the bendable connection comprises a plurality of adjoining bodies having a cylindrical, rotationally symmetrical or polygonal geometry,
the connector has a rotationally symmetrical geometry; and
the outer diameter of the rotationally symmetrical is substantially the same as the outer diameter of the connector.

18. The abandonment and recovery system according to claim 17, wherein:
adjoining ends of the adjoining rotationally symmetrical bodies have complementary shapes that cooperate, or a joint there between, to allow an articulation between adjoining bodies, and
wherein the complementary shapes allow an articulation between adjoining rotationally symmetrical bodies comprised in the range of 5° to 15°.

19. The abandonment and recovery system according to claim 18, wherein either:
- the adjoining rotationally symmetrical bodies are articulately connected the one to the other,
- a series of U-joints is provided, or
- the rotationally symmetrical bodies have at least one of a spherical protrusion on one end and a spherical seat on the other end, such that the spherical protrusion of one of two adjoining rotationally symmetrical bodies fits in the spherical seat of the other one of the two adjoining rotationally symmetrical bodies thereby providing a spherical joint between the two adjoining rotationally symmetrical bodies.

20. The abandonment and recovery system according to claim 17, wherein:
- at least one of the rotationally symmetrical bodies is weighted relative to other ones of the rotationally symmetrical bodies, and
- between the at least one weighted rotationally symmetrical body and the connector part of the pipeline attachment assembly there are a plurality of unweighted rotationally symmetrical bodies, wherein the plurality of unweighted rotationally symmetrical bodies allow for a bend of at least 90°.

21. The abandonment and recovery system according to claim 1, wherein the bendable connection is configured for allowing a bend of at least 90° and a radius configured for pipe laying.

22. The abandonment and recovery system according to claim 1, wherein:
- the bendable connection comprises a plurality of adjoining bodies having a cylindrical, rotationally symmetrical or polygonal geometry,
- the connector has a rotationally symmetrical geometry; and
- the outer diameter of the rotationally symmetrical is substantially the same as the outer diameter of the connector.

* * * * *